United States Patent [19]

Akasaki et al.

[11] Patent Number: 4,859,266

[45] Date of Patent: Aug. 22, 1989

[54] METHOD AND APPARATUS FOR ELECTROSTATIC POWDER SEWING OF FABRICS

[75] Inventors: Toshiro Akasaki, Tokyo; Masafumi Matsunaga, Yokohama; Takashi Watanabe, Omiya; Hironari Matsushima, Tokyo, all of Japan

[73] Assignee: Nordson Corporation, Westlake, Ohio

[21] Appl. No.: 228,606

[22] Filed: Aug. 4, 1988

Related U.S. Application Data

[63] Continuation-in-part of Ser. No. 10,905, Feb. 4, 1987, abandoned.

[30] Foreign Application Priority Data

Feb. 10, 1986 [JP] Japan .............................. 61-028463

[51] Int. Cl.[4] ......................... B32B 31/12; B05B 5/02

[52] U.S. Cl. ................................ 156/273.1; 156/283; 156/274.8; 156/291; 156/380.2; 156/380.3; 156/548; 118/624; 118/629; 427/14.1; 427/27

[58] Field of Search ................. 156/283, 273.1, 274.4, 156/380.2, 291, 548, 274.8; 118/624, 625, 630, 629; 427/286, 32, 27, 14.1; 112/262.1

[56] References Cited

U.S. PATENT DOCUMENTS

| | | | |
|---|---|---|---|
| 2,097,233 | 10/1937 | Meston | 118/629 X |
| 2,128,907 | 9/1938 | Benner et al. . | |
| 2,152,077 | 3/1939 | Meston et al. . | |
| 2,217,444 | 10/1940 | Hill . | |
| 2,509,276 | 5/1950 | Ransburg et al. . | |
| 2,551,035 | 5/1951 | Miller . | |
| 2,651,287 | 9/1953 | Turner . | |
| 2,684,656 | 7/1954 | Ransburg . | |
| 2,718,477 | 9/1955 | Miller . | |
| 2,748,018 | 5/1956 | Miller . | |
| 2,820,716 | 1/1958 | Harmon et al. . | |
| 3,016,876 | 1/1962 | Sedlacsik, Jr. . | |
| 3,496,045 | 2/1970 | Keberle | 156/283 X |
| 3,567,537 | 3/1971 | Marteny et al. | 156/283 X |
| 3,678,336 | 7/1972 | Winkless | 118/630 X |
| 3,746,254 | 7/1973 | Duncan et al. | 239/15 |
| 3,776,187 | 12/1973 | Probst . | |
| 3,870,375 | 3/1975 | Duncan et al. . | |
| 3,930,614 | 1/1976 | Krenkel . | |
| 3,960,323 | 6/1976 | Duncan et al. . | |
| 3,979,529 | 9/1976 | Rebentisch et al. . | |
| 4,246,294 | 1/1981 | Jordan . | |
| 4,378,728 | 4/1983 | Berkmann . | |
| 4,409,009 | 10/1983 | Lissy . | |
| 4,544,424 | 10/1985 | Take et al. . | |
| 4,561,380 | 12/1985 | Mulder et al. . | |
| 4,613,083 | 9/1986 | Mulder et al. . | |
| 4,630,777 | 12/1986 | Hollstein et al. . | |
| 4,634,058 | 1/1987 | Hollstein et al. . | |
| 4,638,951 | 1/1987 | Gabriel . | |

FOREIGN PATENT DOCUMENTS

| | | |
|---|---|---|
| 2243740 | 4/1975 | France . |
| 923684 | 4/1963 | United Kingdom . |

*Primary Examiner*—Robert A. Dawson
*Assistant Examiner*—Michele K. Yoder
*Attorney, Agent, or Firm*—Wood, Herron & Evans

[57] ABSTRACT

A method and apparatus for powder sewing two plies of cloth or fabric material by spraying an adhesive powder onto one side of one ply of cloth or fabric from a powder spray gun having a corona discharge electrode mounted thereon. A second pin electrode is provided on the opposite side of the one ply of cloth or fabric. Electrical charges of differing polarity are applied to the electrodes while the cloth or fabric material is moved between the two and powder is sprayed thereon. In the course of migrating through the electrostatic field created between the two electrodes, the powder is caused to follow the force lines created within that field and to migrate onto one side of fabric in the form of a long, narrow band of powder. A second ply of cloth or fabric is then positioned over the first ply and over the band of powder. Pressure and heat applied to the powder activates the powder and causes it to become tacky so that when subsequently cooled, it adheres the two plies together along the narrow powder band.

12 Claims, 1 Drawing Sheet

METHOD AND APPARATUS FOR ELECTROSTATIC POWDER SEWING OF FABRICS

This application is a Continuation-in-Part of application Ser. No. 010,905, filed Feb. 4, 1987.

This invention relates to the attachment of multiple plies of fabric, and more particularly, to the attachment of one ply of non-woven fabric to a second ply of fabric or flexible sheet material.

Non-woven fabric materials are quite often required to be attached to other fabrics or sheet materials. Such attachment is generally achieved by sewing or adhesively bonding the fabrics together. If the fabrics are to be sewn together, then a great deal of physical handling of the fabrics, as well as expensive needle and thread sewing equipment, is required to effect the attachment. If, as an alternative, the fabrics are attached by adhesive, then the bonds are generally achieved by beads of molten or liquid adhesive. But beads of adhesive, particularly when applied to non-woven fabric, create a relatively hard spot in the non-woven fabric at the site of the adhesive. Furthermore, such beads of adhesive generally require a very substantial amount of expensive adhesive to effect the bond.

It has been an objective of this invention to provide a new method and apparatus for sewing or otherwise attaching non-woven fabrics to other fabrics or substrates along a narrow band of attachment without the characteristic cost of handling and sewing the fabrics with needles and thread and without the characteristic cost and hard spots created by adhesive bonding of non-woven fabrics.

To achieve this objective, the invention of this application is operable to powder sew one fabric to another or to another ply of flexible sheet material by spraying thermoplastic resin powder onto the one fabric in a narrow, linear band, and then layer the second ply of fabric or sheet material over the first, and secure the two together by the application of heat and pressure to the layers.

Recently, the practice has developed of spraying powder on non-woven fabrics in order to impart to the non-woven fabric particular characteristics, as for example, fiber adhesion, liquid absorbency, etc. Such fabrics are electrically non-conductive, and therefore, non-electrostatic powder spraying methods have generally been utilized in the spraying of such fabric.

According to the practice of this invention, the powder must be applied in a long, narrow band. To contain the powder within a narrow band, according to the practice of this invention, the powder is sprayed from a gun on one side of the fabric while an electrical charge of a first polarity is applied to the powder and while an electrostatic charge of a differing polarity is applied to a pin electrode on the opposite side of the non-woven fabric. Preferably, both electrodes are pin electrodes such that their differing polarity achieves a small forcefield through which the electrostatically charged powder migrates toward the pin electrode on the opposite side of the fabric. This forcefield contains the sprayed powder within the forcefield.

According to the practice of this invention, the spray gun is moved in a linear path relative to the cloth or fabric, or the fabric is moved relative to the gun. As a result, the pattern of powder applied to the fabric is a very fine and distinct line of powder on the surface of the fabric. After application of this fine line of powder, a second cloth or fabric is layered atop the powder containing fabric. Heat and pressure are then applied to the surface of the second fabric so as to cause the powder to become molten and adhesive such that after removal of the heat and pressure, the powder cools so as to form a fine line of adhesive bonding the two layers of cloth and fabric.

The primary advantage of the invention of this application is that it enables two layers of cloth or fabric or fabric and other sheet substrate to be sewn together by a very fine line of powdered adhesive applied to one of the substrates before the two are layered and adhered together.

Another advantage of this invention is that it enables two layers of cloth or fabric to be sewn together by an adhesive applied in powder form before the two layers of cloth or fabric are layered and bonded together by th adhesive. This results in a substantial savings of adhesive and in the securement of the two layers by an adhesive which is soft and pliable.

These and other objects and advantages of this invention will be more readily understood with reference to the following description of the drawings in which.

Figure 1:
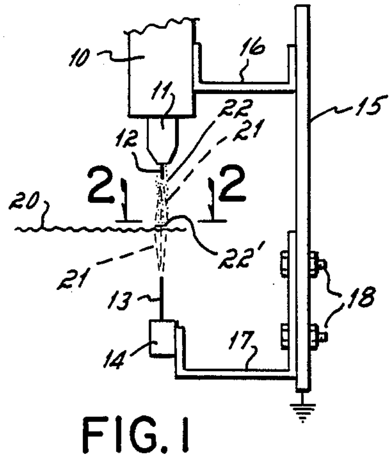
FIG. 1 is a partially schematic, side elevational view of an apparatus used for the practice of this invention.

With reference first to FIG. 1, there is illustrated in diagrammatic form one portion of an apparatus for practicing the invention of this application. This apparatus comprises a powder spray gun 10 having a nozzle 11 from which powder is discharged. Extending from the nozzle there is an electrode or so-called corona pin 12, which electrode is operative to ionize or electrically charge powder dispensed from the nozzle 11. According to the practice of this invention, there is also a second electrode or counterelectrode, sometimes referred to as a countercorona pin 13, located beneath and colinearly aligned with the first electrode 12. The gun 10 and electrode support 14 are both attached to and mounted from a holding frame 15 via support arms 16 and 17, respectively. Preferably, the support arm 17 is vertically adjustable on the holding frame 15 via adjustment screws 18 such that the support arm 17 with its attached electrode support 14 may be moved vertically relative to the powder spray gun 10 and electrode 12 while still maintaining colinear alignment between the two electrodes 12 and 13.

A cloth target substrate is located between the two electrodes 1 and 2. This cloth target substrate 20 is preferably a non-woven fabric. While not shown in FIG. 1, a cloth or fabric support table or conveyor belt may be provided between the electrodes 1 and 2 as explained more fully hereinafter.

In the use of the apparatus disclosed in FIG. 1, an electrical charge is applied to the electrode 12 when powder is sprayed from the nozzle 11 of the gun 10. Simultaneously, an electrical charge of differing polarity, and preferably of opposite polarity, is applied to the electrode 13. The application of these charges to the electrodes creates an electrostatic field within which there are electric force lines 21 generated by corona discharge occurring between the two electrodes. If, as illustrated in FIG. 1, both electrodes are in the shape of pins having sharp or pointed ends, the pattern of the force lines is one of divergence from the electrode 12 toward the target substrate 20 and from the electrode 13 toward the target substrate 20. With electrodes so configured, the pattern of the force lines at the target substrate is a relatively small diameter circle. If powder is sprayed from the gun nozzle 11 while electrostatic charges of differing polarity are applied to the two different electrodes, powder sprayed from the nozzle 11 is caused to follow the lines of force 21 within the electrostatic field created by the two electrodes. The powder so sprayed is caused to flow toward the electrode pin 13 along diverging, small diameter, electric force lines 21 until the powder contacts the substrate 20. This substrate 20 is an electrically non-conductive cloth or similar materials, such as woven or non-woven fabric, having voids that can transmit the electric force lines 21. Fine particles of powder 22 sprayed from the nozzle 11 of the gun 10 follow these force lines from the nozzle 11 toward the electrode 13 until the powder particles contact the substrate 20. The powder particles adhere and form a coating 22' upon the top surface of the substrate 20. If the substrate 20 is caused to move in a straight line while powder is discharged from the nozzle 11 and an electrostatic charge of differing polarity is applied to the electrodes 12 and 13, the powder 22 is applied in the form of a narrow band 23 (FIG. 2) along the locus of cloth movement. The width of the band 23 depends on the voltage at the electrode 12 and the distance between the two electrodes. In one preferred embodiment, that distance is in the range of 1–2 millimeters. The distance, though, will vary with the thickness of the material, the nature of the powder, the magnitude of the change, etc.

Figure 3:
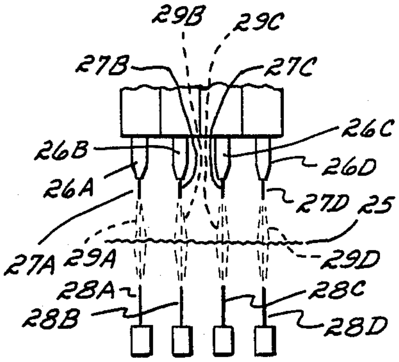
FIG. 3 is a partially schematic, side elevational view of another modification of apparatus used in the practice of the invention of this application.
Figure 4:
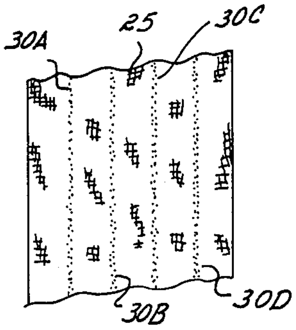
FIG. 4 is a top plan view of a pattern of powder applied to a substrate by the apparatus of FIG. 3.

With reference to FIG. 3, there is illustrated a second form of apparatus for applying multiple, narrow bands of powdered adhesive to a fabric substrate 25. In this embodiment, multiple powder spray guns are provided with multiple powder spray nozzles 26A, 26B, 26C, 26D. An electrode 27A–27D is mounted upon and extends from each of these nozzles. Located on the opposite side of the fabric target substrate 25 there are counterelectrodes 28A–28D located in axial alignment with the electrodes 27A–27D, respectively. When powder is sprayed from the four nozzles 26A–26D toward the target substrate 25 and an electrical charge is applied to the electrodes associated with those nozzles while a charge of opposite polarity is applied to the counterelectrodes 28A–28D, the powder is caused to follow the force lines 29A–29D extending between the axially aligned nozzles. Thereby, four parallel, narrow bands of coating (FIG. 4) are applied to the top side of the cloth substrate 25 as that substrate is moved linearly between the electrodes while the powder is sprayed from the nozzles. These bands 30A, 30B, 30C and 30D are narrow, well-defined bands on the target substrate 25.

Figure 5:
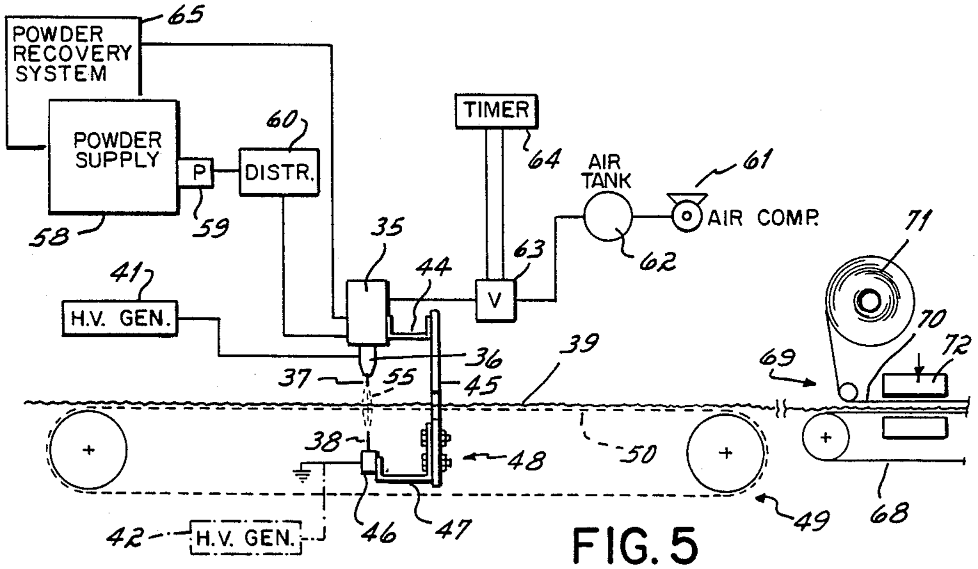
FIG. 5 is a partially diagrammatic, side elevational view of a complete powder spray system utilized in the practice of the invention of this application.

Both modifications described hereinabove are concerned with the structure or mechanism utilized in moving a fabric substrate in a linear path beneath powder spray gun(s) and between oppositely charged electrodes. Referring now to FIG. 5, there is illustrated the overall configuration of a system utilized in accordance with the practice of the invention of this application. This system comprises a powder spray gun 35 having a nozzle 36 attached to the gun. A powder charging electrode or so-called corona pin 37 extends from the nozzle. There is also a second electrode or counterelectrode (sometimes referred to as a corona pin) 38 mounted beneath the fabric substrate 39 to which the powder is applied. There is a high voltage generator 41 connected to the electrode 37 for supplying high voltage power to that electrode. There may also be a high voltage generator 42 connected to the counterelectrode 38, depending upon whether a high voltage of opposite polarity is connected to the counterelectrode or whether that counterelectrode is simply grounded. The powder spray gun 35 is mounted upon a supporting arm 44, which connects it to the holding frame 45. Similarly, the counterelectrode 38 is mounted upon a support 46, which is in turn mounted upon a supporting arm 47 attached to the holding frame 45 via an adjusting mechanism 48. This adjusting mechanism enables the supporting arm 47 to be vertically adjusted relative to the powder spray gun 35 and electrode 37 mounted thereon. There is an endless conveyor belt 49 passing between the electrode 37 and counterelectrode 38. The conveyor belt is an electrically non-conductive net or mesh type belt 50. The electrically non-conductive cloth or fabric target substrate 39 is supported upon the belt 50 and moved thereby between the electrode 37 and counterelectrode 38. The net or mesh type belt 50 is operative to transmit electrostatic force lines 55 generated between the electrode 37 and counterelectrode 38.

Other components of this system include a powder supply tank or reservoir 58, a powder pump 59 for transporting powder from the powder reservoir to a distributor 60, and thence to the powder spray gun 35. There is also an air compressor 61 operative to supply high pressure air to an air reservoir tank 62 from whence the high pressure air is supplied via an intermittent air switching valve 63 to the powder spray gun 35. This high pressure air is operative to operate the gun 35 in accordance with the flow of air to and from the gun via the intermittent air switching valve 63. That valve is in turn controlled by a timer 64. There is also a powder recovery system 65 connected to the powder spray gun 35.

Figure 2:
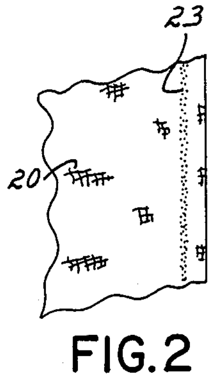
FIG. 2 is a top plan view taken on line 2—2 of FIG. 1 of a pattern of powder applied to an article utilizing the apparatus of FIG. 1.

In the use of the system illustrated in FIG. 5, the electrically non-conductive web of cloth or fabric material 39 to which the powder is applied is transported between the electrodes 37, 38 and beneath the nozzle 36 of the gun 35 on the electrically non-conductive net or mesh type belt 50 of conveyor 49. As the cloth or fabric target substrate 39 moves beneath the nozzle 36, powder ejected from the nozzle is applied to the cloth or fabric in the form of a narrow band 23 of powder, as depicted in FIG. 2 of the drawings.

After the non-conductive web of cloth or fabric material 39 moves off of the belt 50, it is picked up by another endless belt conveyor 68 which is operative to transport it downstream past an overlay station 69. At this overlay station, a second layer of cloth or fabric is applied as an endless web 70 from a roll 71 to the top of the web or cloth material 39. In the course of passage over the conveyor 68, the two-ply overlaid webs 39 and 70 are intermittently stopped beneath a heating a pressure platen 72. While located beneath this platen, pressure is applied to the two plies while the plies are simultaneously heated so as to melt the band 23 of powdered adhesive which had previously been applied to the web 39. After a predetermined time, the heating and pressure platen 72 is removed from atop the overlaid plies 39, and the adhered plies are conveyed forwardly on the conveyor 68.

The effect of the application of heat and pressure upon the powdered adhesive is to render that adhesive molten and tacky. When the adhesive subsequently is cooled, it permanently bonds the two plies 39 and 70 together along the band 23 of powdered adhesive.

All of the individual components of the powder spray system illustrated in FIG. 5 are conventional, and per se, form no part of the invention of this application. Accordingly, those individual components have not been illustrated and described in detail herein.

EXAMPLE

One example of the conditions employed in a system similar to that illustrated in FIG. 5 in order to powder sew one ply of non-woven fabric to another layer or ply of cloth fabric is as follows:

1. Cloth:
   (a) Non-woven fabric of 0.3 to 0.6 mm thick.
   (b) Cotton cloth of 0.4 to 0.5 mm thick.
2. Powder: Nylon copolymer of Nylon 6, 66 and 12 having a grain size of less than 90 microns, and a melting point of 115° to 125° C. (melt index 6 g/10 min.).
3. Form of powder application: Linear form, 1.5 to 2.0 mm wide × about 1 m long.
4. Heating and pressing appliance: Electric iron having the size of 22 cm long × 12 cm wide and weighing about 1.0 kg.
5. Operating conditions:
   (a) Surface temperature of electric iron: 140° to 160° C.
   (b) Pressure given to iron: 40 to 50 g/cm$^2$.
   (c) Pressing time: 4.5 to 9 seconds while moving the iron at 3 to 1.5 m/min.
6. Bonding strength: 300 to 400 g/cm$^2$.

The above-described example describes only one operating condition wherein a non-woven fabric and a cotton cloth were powder sewn together in accordance with the invention of this application. Of course, other conditions utilizing other thermoplastic powder materials may be utilized in the practice of this invention. Accordingly, we do not intend to be limited except by the scope of the following appended claims:

We claim:

1. A method of powder sewing one ply of fabric substrate to a second ply of flexible substrate, which method comprises
   locating said one ply of fabric substrate within an electrostatic field generated by at least two spaced electrodes of differing polarity, one of said electrodes being a pin electrode located on one side of said one ply of fabric substrate,
   spraying powder through said electrostatic field from the opposite side of said one ply of fabric substrate while said one ply of fabric substrate is moved through said electrostatic field whereby said powder is caused to migrate within said electrostatic field toward the electrode on the one side of said fabric substrate and onto the opposite side of said one ply of fabric substrate in a linear band no more than three millimeters in width,
   positioning said second ply of substrate over and in contact with said opposite side of said one ply of fabric substrate, and
   activating said powder so as to render said powder tacky so as to secure said two plies of substrate together.

2. The method of claim 1 wherein said powder is activated by being heated and is subsequently cooled to secure said two plies of substrate together.

3. A method of powder sewing two plies of fabric, which method comprises
   locating one ply of said fabric within a field of electrostatic force lines generated by at least two spaced electrodes of differing polarity, one of said electrodes being a pin electrode located on one side of said one ply of fabric,
   spraying powder through said electrostatic field from the opposite side of said one ply of fabric while said one ply of fabric is moved through said field of electrostatic force lines whereby said powder is caused to migrate within said field of electrostatic force lines toward the electrode on the one side of said fabric and onto the opposite side of said one ply of fabric,
   positioning a second ply of fabric over and in contact with said opposite side of said one ply of fabric, and
   activating said powder so as to render said powder tacky so as to secure said two plies of fabric together.

4. The method of claim 3 wherein said powder is activated by being heated and is subsequently cooled to secure said two plies of fabric together.

5. The method of claim 4 wherein said field of electrostatic force lines is generated by at least one electrode of high voltage on one side of said fabric and a grounded electrode on the opposite side of said fabric.

6. Apparatus for powder sewing a first electrically non-conductive fabric substrate to a second flexible substrate, which apparatus comprises
   a powder spray gun,
   at least one electrode associated with said powder spray gun,
   means for supporting and moving said fabric material in the path of powder sprayed from said gun,
   said powder spray gun and said one electrode being located on one side of fabric material,
   a second pin electrode, said second pin electrode being located on the opposite side of said fabric material,
   means for applying electrostatic charges of differing polarity to said electrodes to create an electrostatic field of force lines between said electrodes whereby powder sprayed from said gun is caused to migrate within said electrostatic field toward the pin electrode on said opposite side of said fabric and onto said one side of fabric material,
   means for positioning a second flexible substrate over and in contact with said one side of said fabric and over the powder sprayed thereon, and
   means for activating said powder so as to render said powder tacky so as to secure said two plies of substrate together.

7. The apparatus of claim 6 wherein said electrostatic field is generated by at least one electrode of high voltage on said one side of said fabric material and a grounded electrode on the opposite side of said fabric material.

8. The apparatus of claim- 6 wherein said powder is caused to migrate onto said one side of said fabric material in a linear band no more than three millimeters in width.

9. The apparatus of claim 8 wherein said means for supporting said fabric material comprises a conveyor for moving said fabric material between said electrodes.

10. A method of powder sewing one ply of electrically non-conductive fabric material to a second ply of flexible substrate, which method comprises spraying powder from a powder spray gun located on one side of said fabric material as said material is moved past said spray gun, applying an electrostatic charge of one polarity to said powder before it contacts said material, locating a pin electrode of opposite polarity on the opposite side of said material from said one side whereby said powder is applied to said one side of said material in a long, narrow, well-defined band of no more than three millimeters in width, positioning said second ply of substrate over said one side of said fabric and over said band of powder applied thereto, and activating said band of powder so as to render said powder tacky so as to secure said plies together.

11. The method of claim 10 wherein said field of magnetic force lines is generated by an electrode of high voltage on one side of said fabric and said pin electrode is grounded on the opposite side of said fabric.

12. The method of claim 10 wherein said powder is activated by being heated and is subsequently cooled to secure together said two plies.

* * * * *